United States Patent [19]
Jansen et al.

[11] 3,858,390
[45] Jan. 7, 1975

[54] POWER TURBINE NOZZLE CONTROL SYSTEM

[75] Inventors: Harvey B. Jansen; Milton R., both of Adams, Tempe, Ariz.

[73] Assignee: The Garrett Corporation, Los Angeles, Calif.

[22] Filed: June 4, 1973

[21] Appl. No.: 366,817

[52] U.S. Cl............... 60/39.14, 60/39.17, 60/39.25
[51] Int. Cl. .......................................... F02c 7/26
[58] Field of Search............... 60/39.25, 39.17, 39.2, 60/39.13, 39.14

[56] References Cited
UNITED STATES PATENTS

| | | | |
|---|---|---|---|
| 3,181,295 | 5/1965 | Pauwels | 60/39.25 X |
| 3,252,686 | 5/1966 | Chadwick | 60/39.25 X |
| 3,621,657 | 11/1971 | Jurisch | 60/39.25 |
| 3,777,479 | 12/1973 | Hagen | 60/39.25 |
| 3,777,482 | 12/1973 | Canale | 60/39.25 X |

Primary Examiner—Clarence R. Gordon
Attorney, Agent, or Firm—Herschel C. Omohundro; Jack D. Puffer; Albert J. Miller

[57] ABSTRACT

A vehicular gas turbine engine has gas generator and power turbine sections, the latter having nozzle vanes which are adjustable to control power turbine speed and turbine temperature, as well as idle and engine braking phases. The subject system controls the adjustment of the nozzle vanes of the power turbine section. The system has a fluid pressure responsive vane actuator with a servo valve and positioning means therefor which are responsive to fluid pressure controlled in part by the throttle of the engine and in part by the speed of operation of the gas generator and power turbine sections of the engine. The servo valve positioning means is connected with the servo valve and vane actuator by linkage which is also responsive to movement of engine throttle means. The servo valve positioning means responds to fluid pressure the application of which is controlled by valve means actuated in accordance with speeds of the gas generator and power turbine sections of the engine.

15 Claims, 7 Drawing Figures

POWER TURBINE NOZZLE CONTROL SYSTEM

BACKGROUND OF THE INVENTION

This invention relates generally to gas turbine engines of the type employed to propel vehicles. It is more particularly related to engines having gas generator and power turbine sections and more especially to a control system for the nozzle vanes of the power turbine sections of such engines. The control system includes a fluid pressure responsive actuator for the nozzle vanes and a servo valve linked to the actuator and to servo valve positioning means, including throttle actuated means and fluid pressure responsive means. In respect to a fluid pressure actuator with servo valve control, manually actuated in part, the invention may be generally classed with U.S. Pat. No. 2,929,362 to Hayner. The instant control system also includes elements responsive to parameters of engine operations to effect control functions and in this respect may be generally classed with U.S. Pat. No. 3,155,103 to Moellmann. As to the utilization, in part, of the throttle movement for control, the invention may be generally classed with U.S. Pat. No. 3,031,840 to Hegg.

SUMMARY OF THE INVENTION

An object of this invention is to provide a control system for the nozzle vanes of a power turbine, the system being substantially automatic in operation and serving to place the nozzle vanes initially in position to facilitate the starting of the gas generating section of the engine. After the starting operation is performed, the nozzle vanes are adjusted to a position to drive the power turbine section while the gas generator section is at idle speed, and when the throttle is moved to accelerate the engine the angularity of the nozzle vanes is trimmed to control turbine inlet temperature. Upon return movement of the throttle to idle position, the vanes are adjusted to direct gases from the generator section against the power turbine blades in a manner to decelerate and brake the engine.

An object of the invention also is to provide a control system for the nozzle vanes of a power turbine having a fluid pressure responive nozzle vane actuator, a servo valve with positioning means therefor linked to the valve and actuator and responsive in part to engine throttle movement, the positioning means being resiliently retained in a normal position until moved under fluid pressure to other locations in the operation of adjusting the nozzle vanes to effect various engine operating modes, such as part throttle turbine temperature control, engine idle and engine deceleration and/or braking.

A further object of the invention is to provide the nozzle control system of the preceding paragraphs with mechanism responsive in part to the speed of the gas generator section of the engine to control the application of fluid pressure to the servo valve positioning means whereby the vane actuator will dispose the power turbine nozzle vanes in an optimum position for starting the gas generator, then when the starter cut-out speed is reached, the application of fluid pressure to the positioning means will be discontinued and the positioning means will automatically move to a different location in which the vane actuator will place the power turbine nozzle vanes at a predetermined turbine driving angle preparatory to useful power turbine operation.

A still further object of the invention is to provide the nozzle control system of the preceding paragraphs with mechanism responsive in part to the speed of the power turbine section of the engine to control the application of fluid pressure to the servo valve positioning means during the acceleration and intermediate speed operation of the engine to cause the vane actuator to impart trim adjustment to the nozzle vanes to control turbine inlet temperature and consequently exhaust gas emissions and fuel economy.

Another object is to arrange the power turbine speed responsive mechanism mentioned in the preceding paragraph so that predetermined throttle movement will activate or inactivate certain parts of the mechanism and change the mode of operation of the nozzle vanes.

Other objects and advantages of the invention will be either specifically set forth or made obvious by the following description of one form of the invention which has been shown in the accompanying drawings.

IN THE DRAWINGS

DESCRIPTION OF THE DISCLOSURE

Figure 6:
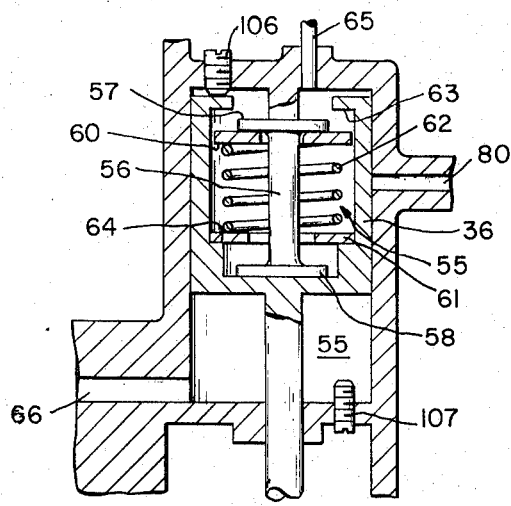
FIGS. 4, 5, 6, and 7 are detail sectional views showing parts of the mechanism in different positions during system operation.
Figure 7:
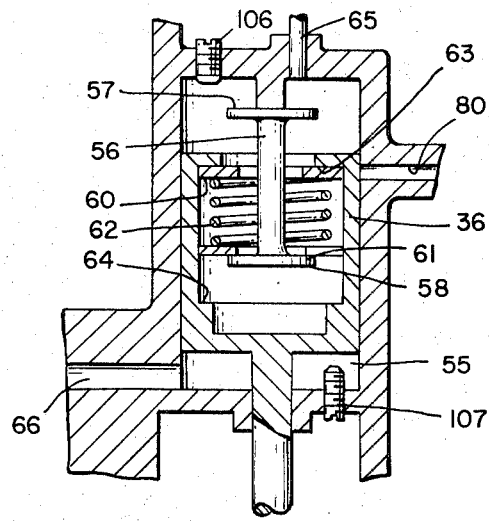
Figure 1:
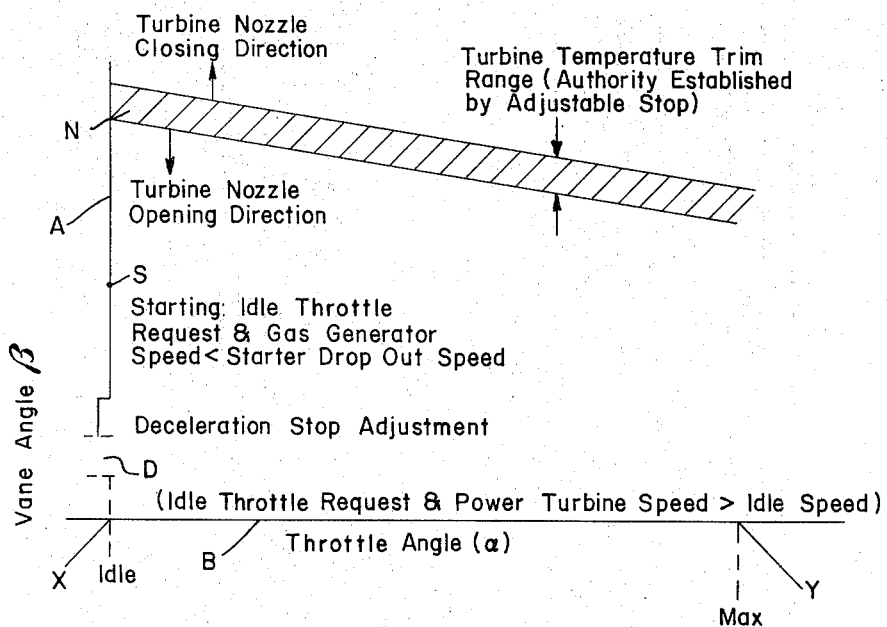
FIG. 1 is a plot of the nozzle vane angle ($\beta$) versus the throttle angle ($\alpha$) to illustrate the turbine nozzle positional logic of the system.

Referring more particularly to the drawings, the positional logic of the power turbine nozzle vanes has been illustrated in FIG. 1 by plotting the vane angle ($\beta$) versus the throttle angle ($\alpha$). In this figure, the angular movement of the nozzle vanes is represented by vertical direction while the movement of the throttle is represented by horizontal direction. The range of vane adjustment during power turbine governing is indicated by line (A). The range of throttle adjustment from idle to maximum is indicated by line (B).

The letter S designates a point intermediate the length of line (A) at which the nozzle vanes are disposed to offer the least resistance to gas generator section starting. At this time, the throttle means will be disposed in a position to call for engine operation at "idle" speed and the gas generator speed will be zero or less than that at which the engine starter is designed to cut out. When the gas generator attains starter cut-out speed, the power turbine nozzle vanes will be moved toward a substantially closed position (indicated by the letter N near the upper end of line (A) in FIG. 1) to direct the exhaust gases from the gas generator turbine against the blades of the power turbine to effect rotation thereof. After the starter drops out, the gas generator will continue to accelerate until reaching a speed (approximately 50 percent full speed) determined by the setting of the gas generator governor and throttle means. Due to the increased angularity of the power turbine nozzle vanes, the acceleration of the gas generator will also cause an acceleration of the power turbine. At this time a governor responsive mechanism associated with the power turbine will cause the nozzle vanes to be moved toward open position to establish an "idle" speed of the power turbine at which normal load applications (such as imposed by vehicle accessories) may be driven.

The engine is now ready for useful operation of the power turbine which will be controlled through the actuation of the throttle means (power turbine throttle advancing movement represented by $+\alpha$) to inactivate the power turbine governor responsive mechanism and activate a power turbine nozzle vane angle trimming device with which the power turbine nozzle vane angle is automatically adjusted over a schedule represented by the cross hatched space between two inclined lines extending from the "idle" throttle angle to the maximum throttle angle (indicated by points X and Y, respectively, on the horizontal line B). This vane angle trim adjustment limits the turbine inlet temperature to optimum or safe values during the use of the power turbine.

When the need for power development by the power turbine ceases, the throttle means is moved back to "idle" position, the automatic vane angle trimming device is inactivated and the power turbine governor responsive mechanism is reactivated. The effect of this step is the movement of the power turbine nozzle vanes back through starting position to the opposite end of the range of adjustment (represented by point D on line A) wherein the gases from the gas generator are directed against the power turbine vanes in a manner to cause deceleration of the power turbine and the application of an engine braking effect.

After the power turbine has decelerated sufficiently, the power turbine governor responsive mechanism moves the power turbine nozzle vanes to a position to maintain the power turbine at its "idle" speed, wherein the load imposed by the accessories will be driven. The engine is again in the "ready for operation" state and readvancement of the throttle means will initiate a repetition of the foregoing cycle of operation.

Figure 2:
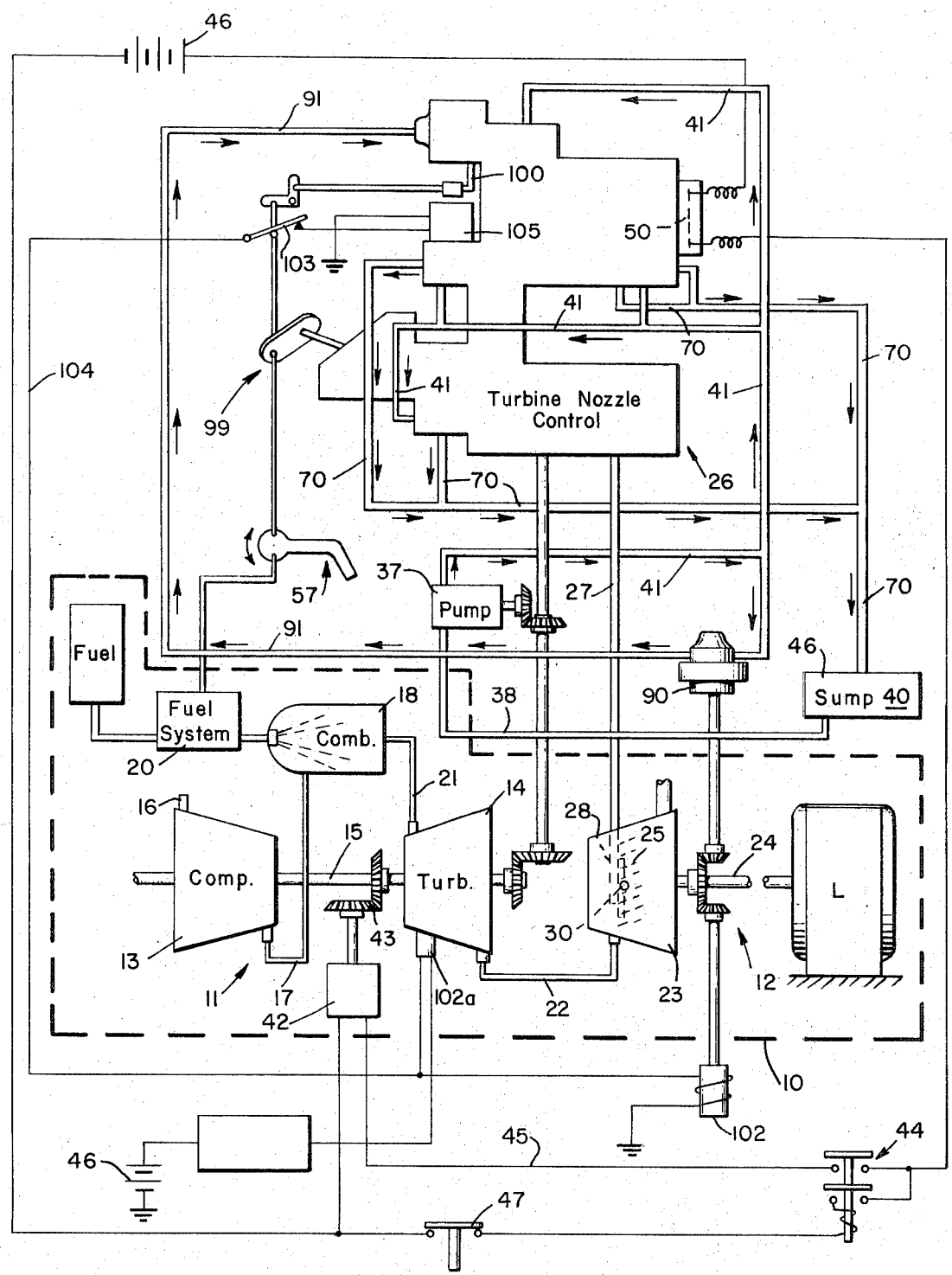
FIG. 2 is a schematic view showing an engine with gas generator and power turbine sections and a power turbine nozzle vane control system embodying the present invention.

With the objectives above outlined in mind, the control system selected for illustration will now be described in detail. Referring more particularly to FIG. 2, the numeral 10 generally designates a gas turbine engine of the type to which the control system of the invention is applied in the adaptation of such an engine to automotive or other vehicular use. The engine 10 has gas generator and power turbine sections 11 and 12, respectively. Section 11 includes compressor and turbine portions 13 and 14 connected for rotation in unison by a shaft 15. The compressor 13 draws air in through the inlet 16 and discharges air under pressure through passage 17 to a combustor 18 for mixture with fuel supplied by a fuel system 20. The fuel-air mixture is burned in the combustor 18 and discharged through passage 21 to the turbine 14 to effect rotation of the turbine compressor rotor assembly of the gas generator section. Gases exhausted from the turbine 14 are directed through passage 22 to the power turbine 23 of the engine section 12 to perform useful work, such as driving a load (L) through rotation of shaft 24. The operating modes and efficiency of the power turbine are controlled, in part, by the angular position of the power turbine nozzle vanes, represented by dotted lines 25 in FIG. 2. To adjust such nozzle vanes in accordance with the desired operating mode of the engine, the turbine nozzle control system of the invention has been provided. The system is designated generally by the numeral 26 in FIG. 2. From the latter figure it will be seen that a push rod 27 extends from the control system mechanism to the power turbine section where it is equipped with a rack 28 for cooperation with a pinion 30 to effect the adjustment of the vanes 25.

Figure 3:
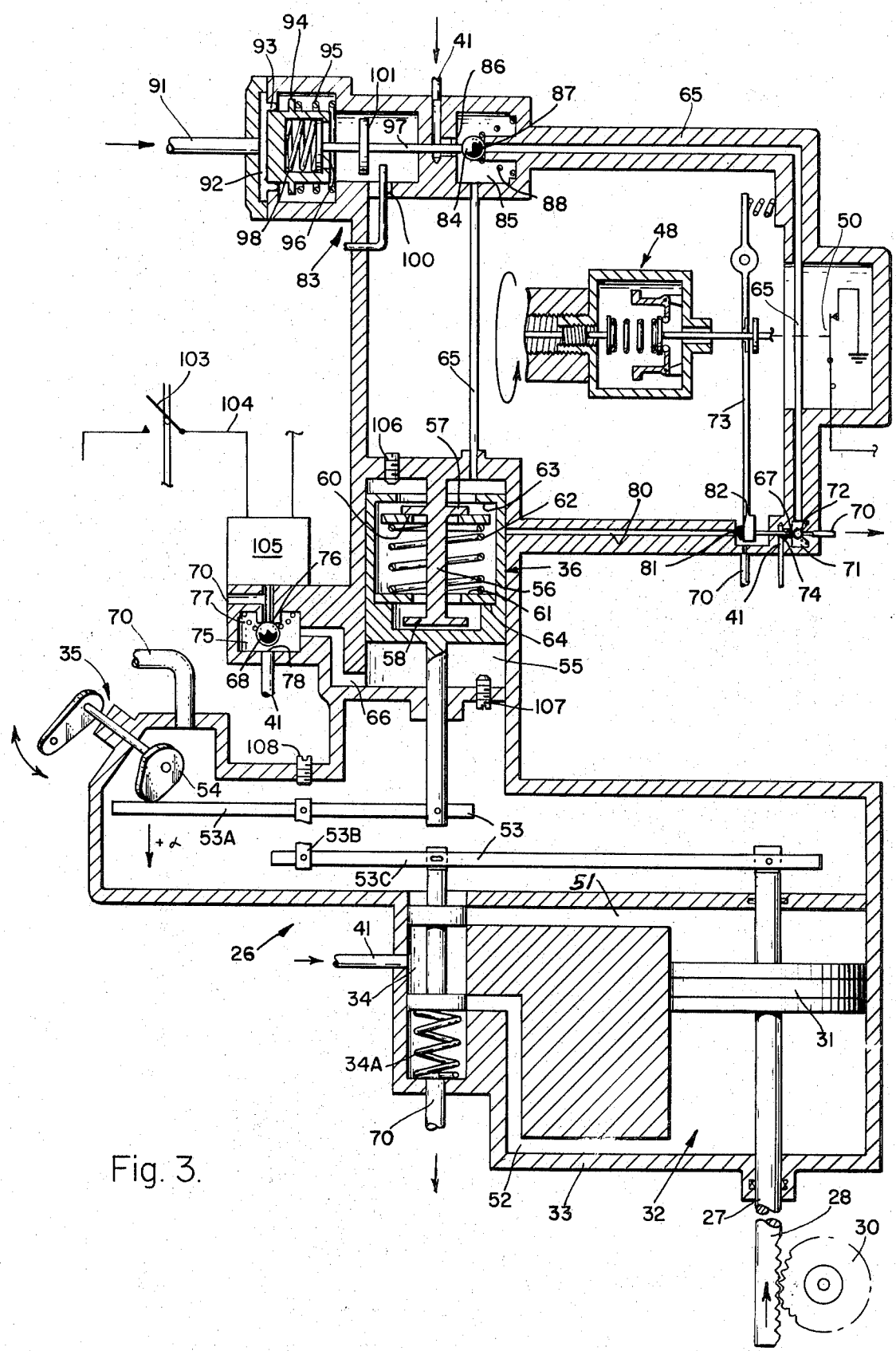
FIG. 3 is also a schematic view showing the details of the mechanism employed in the control system of the present invention.
Figure 4:
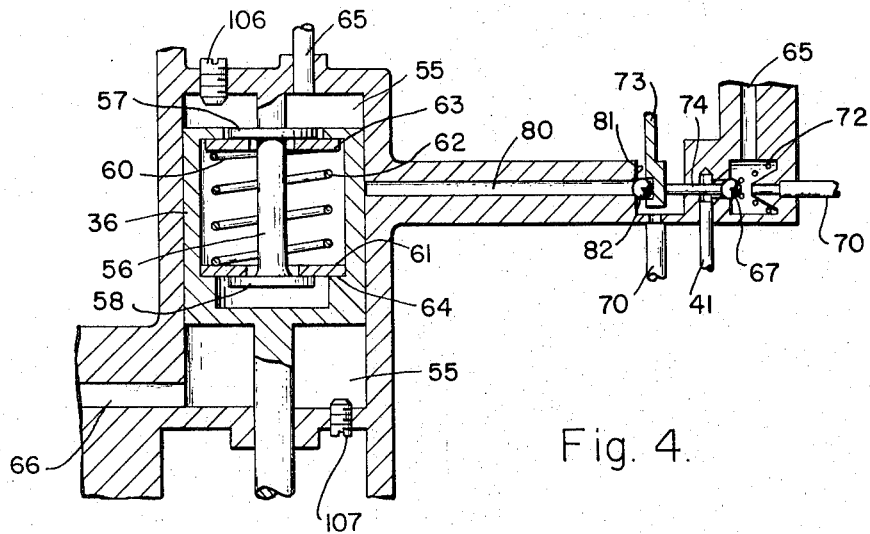
Figure 5:
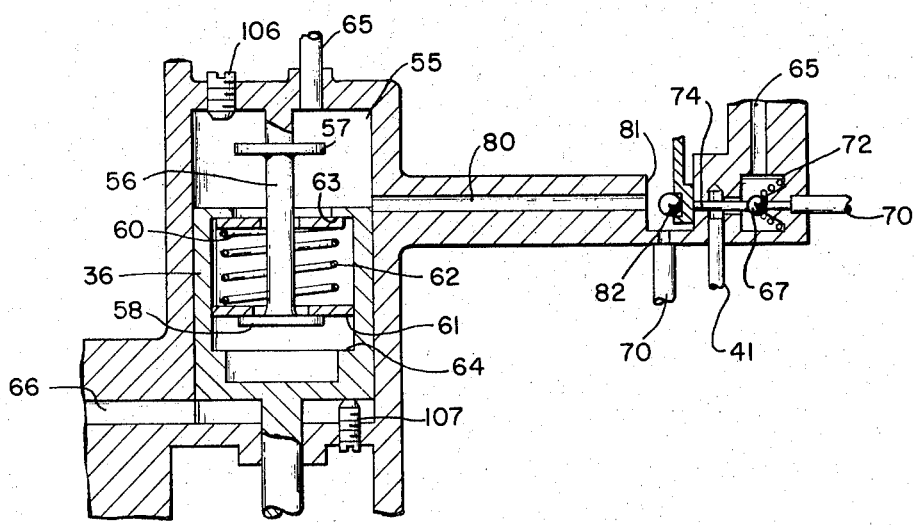

FIG. 3 shows that the rod 27 is connected with the piston 31 of a fluid pressure responsive nozzle vane actuator designated generally by the numeral 32. Such actuator and other parts of the control mechanism are contained, as shown for purposes of illustration only, in a casing 33 which may be of any suitable form depending upon the desires of the manufacturer. The actuator 32 is responsive to fluid pressure under the control of a servo valve 34 which is spring pressed, as at 34A, and positioned in part by throttle means 35 and servo valve positioning means 36, the latter, as well as other mechanism to be described later, also being responsive to fluid pressure in its operation. As shown in FIG. 2, the engine 10 is equipped with a pump 37 driven by the gas generator section 11 to draw fluid through line 38 from sump 40 and supply the system 26 with fluid under pressure through line 41.

To initiate the operation of the engine 10, a starter motor 42 has a driving connection 43 therewith. A starter switch 44 in a circuit 45 including a battery 46 and safety stop switch 47 is provided. When the switch 44 is depressed, the starter motor 42 will impart rotation to the compressor and turbine rotor assembly in the usual manner. The compressor will supply compressed air to the combustor and fuel from the fuel system will be mixed with the air and burned, the resulting hot gases flowing to the turbine to apply driving forces thereto. When the gas generator rotor assembly reaches a speed at which operation will be self-sustaining (approx. 35 percent full speed), a flyweight governor 48 (See FIG. 3) driven by the gas generator will open a switch 50 in the circuit 45 to in turn open starting switch 44 and current flow to the starting motor 42 will be discontinued. Switch 50 may be designated as the gas generator starter drop-out switch. The gas generator will continue to accelerate to "idle" speed (approx. 50 percent full speed) determined by the setting of the governor and throttle means 51. The fuel system may be of the type shown in our co-pending application, Ser. No. 338,022 filed Mar. 5, 1973 or any other suitable type.

As pointed out previously, the engine 10 has various desired operating modes in which the nozzle vanes of the power turbine are in different positions. For example, during the gas turbine section starting phase, the power turbine nozzle vanes are in open position intermediate their full angular adjustment, so that the least resistance to gas generator turbine rotation will be offered. The control system of the invention automatically places the nozzle vanes in such position when the engine starting phase is initiated.

From FIG. 3 it will be observed that the mechanism of system 26 includes the actuator 32, the servo valve 34 which controls pressure fluid flow to and from the actuator through passages 51 and 52, the servo valve positioning piston 36, and link means 53 for transmitting motion from the piston 36 and a throttle actuated cam element 54 to the servo valve. The link means also transmits movement from actuator piston 31 to the servo valve in the usual feedback manner.

The servo valve positioning means 36 is of a unique character in that the piston 36, which is disposed for movement in a cylindrical chamber 55 in casing 33, is hollow. A projection 56 extends from the casing into the interior of the piston and is provided with spaced heads 57 and 58. A pair of rings 60 and 61 surround the projection 56 between the heads, the rings being disposed at the ends of a spring 62 which tends to urge the rings toward the heads 57 and 58. The inner wall of the piston has shoulders 63 and 64 for engagement with the rings so that the spring will yieldably oppose movement of the piston from a predetermined normal position in the cylindrical chamber. The spring arrangement will move the piston 36 to such normal position when pressures at the ends of the piston are equalized. The arrangement will obviously permit movement of the piston in one or the other direction in response to fluid pressure differentials at opposite ends thereof. To impart movement to the piston 36, fluid under pressure may be supplied to one or the other end of the chamber 55 through passage 65 or 66, valve means 67,68, respectively, being provided in such passages to control the connection thereof with line 41 leading from pump 37 or line 70 leading to sump 40.

Passage 65 communicates with the upper end of chamber 55 and leads to a chamber 71 containing valve 67. Fluid pressure line 41 and fluid sump line 70 both connect with chamber 71, valve 67 being biased toward a seat at the point of connection with line 41 by a spring 72. Valve 67 may be moved against the force of spring 72 to engage a second seat to interrupt communication between chamber 71 and sump line 70. When the gas generator section turbine is not rotating or is at a speed less than starter drop-out speed, a spring pressed lever 73 and push pin 74 engaged thereby hold valve 67 against the second seat to prevent flow from chamber 71 to the sump. When so held, valve 67 permits flow from pressure line 41 through passage 65 to the upper end of chamber 55. Application of fluid pressure in this manner causes piston 36 to move in a downward direction and fluid in the lower end of chamber 55 will be discharged through passage 66, through valve chamber 75 to sump line 70 via seat 76. Ball valve 68 in chamber 75 is normally spaced from seat 76 by a spring 77 which yieldably holds the valve in engagement with a seat 78 surrounding a port communicating with pressure line 41.

Downward movement of piston 36 is transmitted by linkage 53 to the servo valve 34, causing it to establish communication between pressure fluid line 41 and passage 52 which leads to the lower end of the vane actuator 32. Communication is also established by the servo valve between the upper end of the actuator 32, via passage 51 and the interior of casing 33, and sump line 70. Admission of pressure fluid to the lower end of actuator 32 causes piston 31 to move upwardly which movement is transmitted by rod 27, rack 28, and pinion 30 to the nozzle vanes to move them toward the open position in which free rotation of the gas generator turbine will be least obstructed. Starting of the gas generator section will thus be facilitated. Due to the provision of the leverage 53, movement of actuator piston 31 is fed back to the servo valve, tending to close the same and discontinue actuator piston movement. The actuator piston moves as long as the servo valve positioning piston 36 is moving.

To stop the actuator when the nozzle vanes are in the optimum gas generator start position, a passage 80 leads from a predetermined point in the wall of chamber 55 to a valve seat 81, which registers with a ball valve 82 supported for movement with lever 73. Seat 81 opens to the interior of a portion of casing 33 which communicates with sump line 70. At all times when the gas generator turbine speed is less than starter cut-out speed, valve 82 will be spaced from seat 81. Thus, when the upper end of piston 36 exposes the chamber end of passage 80, downward movement of the piston 36 will stop, and the power turbine nozzle vanes will be held in the optimum position for gas generator turbine starting. When the gas generator turbine reaches starter cut-out speed, the flyweight governor 48 will move lever 73, causing valve 82 to engage seat 81, closing passage 80. Such movement of lever 73 also permits spring 72 to move valve 67 to establish communication between passage 65 and the vent line 70. At this time, the upper end of chamber 55 will be vented, equalizing pressure at opposite ends of piston 36. It should be obvious that such equalization of pressure at the ends of piston 36 will permit spring 62 to move the piston up to its normal position. This movement causes upward movement of the servo valve to admit pressure fluid to the upper end of actuator 32 and vent the lower end by establishing communication between passage 52 and sump line 70. Piston 31 will then move the nozzle vanes toward a position in which the exhaust gases from the gas generator turbine will be directed against the power turbine vanes to impart rotary motion to the power turbine and shaft 24.

After the starter cuts out, the gas generator turbine will continue to accelerate, as previously mentioned, until it reaches "idle" (which is approximately 50 percent full speed). The throttle means during starting and at this time will call for "idle" operating conditions.

When the engine is operating in the "idle" phase, a power turbine governor responsive valve mechanism 83 may apply fluid pressure to the servo valve positioning means to cause the actuator to adjust the power turbine nozzle vanes toward open position to limit power turbine speed. Mechanism 83 includes a ball valve 84 disposed in a chamber 85 intermediate the length of passage 65. Chamber 85 has a pair of valve seats 86 and 87 between which valve 84 is movable. A spring 88 normally urges valve 84 toward seat 86 which communicates with fluid pressure line 41. Engagement of valve 84 with seat 86 permits passage 65 to establish communication between the upper end of chamber 55 and the chamber containing valve 67. When the gas generator speed is in excess of starter cut-out speed, chamber 55 is usually connected with vent line 70. Mechanism 83 also includes means for moving valve 84 against the force of spring 88 to admit fluid under pressure to chamber 85 and potentially to the upper end of chamber 55 for application to the piston 36. The position of valve 84, relative to seats 86 and 87, will determine the pressure in chamber 85. To move valve 84 in accordance with the speed of the power turbine, the latter is provided with a governor 90, to which fluid from pump 37 is directed. A quantity of fluid proportionate to the speed of the power turbine is directed from the governor 90 (See FIG. 2) through passage 91 to a diaphragm chamber 92 (See FIG. 3) of mechanism 83. This pressure fluid is applied to a diaphragm 93 to move an adapter 94 in opposition to the force of a spring 95. The adapter contains a plunger head 96 which is disposed on the end of a push rod 97 axially registering with the valve 84. A spring 98 permits relative movement, when necessary, between the head 96 and the adapter 94. When the throttle means is in "idle" position, sufficient fluid pressure applied to diaphragm 93 will move ball valve 84 from seat 86 to seat 87, allowing fluid under pressure to be applied to the upper end of piston 36. This pressure will move piston 36 downwardly, causing movement of valve 34 and consequent power turbine vane movement toward open position, which will reduce power turbine speed. The extent of adjustment of the power turbine nozzle vanes will obviously be determined by the speed of the power turbine. A reduction in power turbine speed will reduce the pressure applied to diaphragm 93, and spring 95 may move the rod 97 toward the left, as viewed in FIG. 3, permitting valve 84 to move toward seat 86 and away from seat 87. This movement will vent some of the pressure fluid from the upper end of chamber 55 to allow piston 36 to move upwardly, which will in turn move servo valve up causing downward movement of the actuator and closing adjustment of the power turbine nozzle vanes. Additional power will thus be applied to again increase power turbine speed.

The above described action occurs while the throttle means is in the "idle" position and the engine is operating in the "idle" or "ready for use" mode.

When driving power is to be exerted (engine duty cycle), the throttle means is advanced to apply more fuel to the gas generator and cause it to accelerate. Obviously, the increase in gas generator exhaust gas discharge will cause the application of more power to the power turbine and it will also accelerate. To prevent the mechanism 83 from changing the nozzle vane angle due to this power turbine acceleration, the advancing movement of the throttle is transmitted via rods and levers 99 to a finger 100 which inactivates the power turbine governor responsive valve mechanism 83. Movement of finger 100 is transmitted via collar 101 to rod 97, causing it to move toward the left, as viewed in FIG. 3, and permit ball valve 84 to engage seat 86. Such movement of valve 84 exposes seat 87 and vents the space in chamber 55 above piston 36. If such piston is not then in its normal position, it will automatically move to such position, causing the power turbine nozzle vanes to move toward the angle to develop maximum power. Since advancing the throttle increases the fuel to the gas generator turbine and the quantity of hot gases discharged thereby the power turbine nozzle vanes may be adjusted in an opening direction to secure maximum utilization of power and prevent the application of excessive temperatures to the turbine. To accomplish these ends, the cam element 54 is designed to move part 53A of link means 53 in a downward direction (+α) which movement is transmitted by part 53B to part 53C and servo valve 34. This movement admits pressure fluid to the underside of piston 31, causing upward movement thereof and consequent opening movement of the nozzle vanes. As previously pointed out, movement of piston 31 is fed back through link means part 53C to valve 34 to close it and interrupt the application of pressure fluid to the actuator when control movement of the positioning means (either cam 54 or piston 36 or both) is discontinued.

Advancing movement of the throttle means also closes a switch 103 connected in a circuit 104 including a pulsing solenoid 105. The armature of this solenoid is connected with valve 68 in chamber 75. Solenoid 105 is caused to pulsate or make valve 68 open and close or dither at a rate in proportion to the speed of the power turbine as determined by a monopole generator 102 or in proportion to the temperature of the gases at the turbine inlet as sensed by a sensor 102A (FIG. 2). This repetitive opening and closing of valve 68 alternately admits pressure fluid to, and vents fluid from, the lower end of chamber 55 to apply a controlled pressure to the underside of piston 36. Since the upper end of chamber 55 is now vented, the pressure applied to the lower end of piston 36 will move it upwardly, causing similar movement of the servo valve which results in downward movement of the actuator piston and closing movement of the power turbine nozzle vanes. Such movement during part throttle operation allows turbine inlet temperature trim. The extent of temperature trim movement of piston 36 is limited by an adjustable stop screw 106 threaded into the upper wall chamber 55. The concept of this part throttle turbine temperature control is for the purpose of controlling exhaust gas emissions and fuel economy.

After the power requirement has been satisfied, the return of the throttle means to "idle" position will open switch 103 and render pulsing solenoid 105 inactive. Spring 77 will move ball valve 68 into engagement with seat 78 and discontinue the admission of pressure fluid to the lower end of chamber 55. The latter end of the chamber will then be vented to sump line 70. The return of throttle means to "idle" position also withdraws finger 100 from collar 101, allowing rod 97 to move ball valve 84 from seat 86 to seat 87. Pressure fluid may then be applied to the upper end of spool 36 to move it downwardly, such movement being transmitted through linkage 53 to servo valve 34. As previously pointed out, downward movement of the valve 34 admits pressure fluid to the lower end of the actuator 32 which causes the piston 31 to move upwardly. Such movement makes the nozzle vanes move from the power turbine driving position through the fully open or "start" position to a position in which the gases are directed against the power turbine vanes to tend to resist forward rotation. This action causes a deceleration of the turbine and a braking of the engine. The extent of movement of the piston in a downward direction to effect deceleration and engine braking is limited by a stop screw 107 adjustably received by the lower end wall of chamber 55. After the engine has decelerated to a speed determined by the setting of the governor 90 and the force of spring 95, the pressure of fluid applied to the upper end of piston 36 will be modulated to permit such piston to move back toward normal position. This movement will adjust the power turbine nozzle vanes to again place the engine in the "idle" operating mode. If, during deceleration, power is suddenly required, the throttle means may be advanced to interrupt deceleration and adjust the nozzle vanes to a power turbine driving angle. The advancement of the throttle will reactivate the pulsing solenoid and the vane angle trimming means. The amount of turbine temperature trim can be controlled by a trim authority stop screw 108 adjustably threaded into the casing 33 in registration with the upper end of link part 53B.

We claim:

1. In an engine having gas generator and power turbine sections with throttle means, a control system for the nozzle vanes of the power turbine section, comprising:
   a. a fluid pressure responsive nozzle actuator member;
   b. servo valve means controlling the application of fluid pressure to said actuator member;
   c. servo valve positioning means having a movable member resiliently biased toward a predetermined normal position, said member being movable under fluid pressure differentials at opposite ends thereof;
   d. linkage means connecting the movable member of said valve positioning means with said servo valve means and said actuator member;
   e. an element engaging a portion of said linkage means and the throttle means of the engine, said element serving to impart predetermined movement to said servo valve when the throttle means is moved;
   f. means operative when the speed of the gas generator section is below a predetermined value to apply fluid pressure to one end of said member to move the same to a position in which the power turbine nozzle vanes will be in a state to facilitate engine starting;
   g. means operative when the gas generator section reaches a predetermined speed to interrupt the application of fluid pressure to said one end of said member and cause movement thereof to said normal position, such movement causing said nozzle vane actuator to adjust the nozzle vanes to a power turbine driving angle;
   h. means responsive to power turbine speed for creating pressure differentials at opposite ends of said servo valve positioning member to impart vane angle trimming adjustment to said vane actuator to control gas turbine inlet temperature; and
   i. means connected for operation by said throttle means for rendering said power turbine speed responsive means inoperative.

2. The power turbine nozzle vane control system of claim 1 in which the movable member of the servo valve positioning means is a piston.

3. The power turbine nozzle vane control system of claim 2 in which the piston is disposed for reciprocation in a cylindrical chamber and means are provided for applying fluid under pressure to and venting fluid pressure from at least one end of said chamber at predetermined times controlled by power turbine speeds.

4. The power turbine nozzle vane control system of claim 3 in which means responsive to predetermined movements of the engine throttle means renders said fluid pressure applying and venting means active and inactive.

5. The power turbine nozzle vane control system of claim 3 in which spring means are provided to bias said piston toward said predetermined normal position when fluid pressure is vented from the ends of said chamber.

6. The power turbine nozzle vane control system of claim 5 in which the piston is hollow and said spring means are disposed therein.

7. The power turbine nozzle vane control system of claim 1 in which the means for applying fluid pressure to one end of said movable member when the gas generator section speed is below a predetermined value includes fluid pressure inlet and vent passages and valve means therein for opening and closing such passages in accordance with the speed of the gas generator section of the engine.

8. The power turbine nozzle vane control system of claim 7 in which means for actuating the valve means in said inlet and vent includes a gas generator operated governor and means for transmitting motion from the governor to said valve means.

9. The power turbine nozzle vane control system of claim 1 in which the means responsive to power turbine speed for creating pressure differentials at opposite ends of the servo valve positioning member includes fluid pressure inlet and vent passages and valve means therein for opening and closing such passages in accordance with the speed of the power turbine section of the engine.

10. The power turbine nozzle vane control system of claim 9 in which means are provided for actuating the valve means in said inlet and vent passages, such actuating means including a power turbine operated governor and means controlled thereby for actuating at least one portion of said valve means.

11. The power turbine nozzle vane control system of claim 9 in which means are disposed to be actuated by predetermined movement of the throttle means to render said valve actuating means inoperative.

12. The power turbine nozzle vane control system of claim 10 in which the means for actuating the valve means in said inlet and vent passages includes fluid pressure responsive means and other means controlled by the power turbine operated governor for applying fluid pressure to said fluid pressure responsive means in accordance with the speed of operation of the power turbine section of the engine.

13. The power turbine nozzle vane control system of claim 10 in which electroresponsive means are provided for actuating another portion of said valve means.

14. The power turbine nozzle vane control system of claim 13 in which means are disposed to be actuated by predetermined movement of the throttle means to render the means controlled by the power turbine governor and said electroresponsive means inoperative.

15. The power turbine nozzle vane control system of claim 1 in which means are provided to limit the extent of movement of said servo valve positioning member in the vane angle trimming adjustment operation thereof.

* * * * *

UNITED STATES PATENT OFFICE
CERTIFICATE OF CORRECTION

Patent No. 3,858,390　　　　　　　　Dated Jan. 7, 1975

Inventor(s)　Harvey B. Jansen and Milton R. Adams

It is certified that error appears in the above-identified patent and that said Letters Patent are hereby corrected as shown below:

Inventors: Harvey B. Jansen; Milton R., both of
　　　　　　Adams, Tempe, Ariz.

should read

Inventors: Harvey B. Jansen; Milton R. Adams,
　　　　　　both of Tempe, Ariz.

Signed and sealed this 4th day of March 1975.

(SEAL)
Attest:

RUTH C. MASON
Attesting Officer

C. MARSHALL DANN
Commissioner of Patents
　and Trademarks